United States Patent
Dempsey et al.

(10) Patent No.: US 12,553,972 B2
(45) Date of Patent: Feb. 17, 2026

(54) RELATIVE ELECTRON DENSITY MAPPING FROM MAGNETIC RESONANCE IMAGING

(71) Applicant: ViewRay Systems, Inc., Denver, CO (US)

(72) Inventors: James F. Dempsey, Pebble Beach, CA (US); Iwan Kawrykow, Sofia (BG)

(73) Assignee: ViewRay Systems, Inc., Denver, CO (US)

( * ) Notice: Subject to any disclaimer, the term of this patent is extended or adjusted under 35 U.S.C. 154(b) by 95 days.

(21) Appl. No.: 18/491,426

(22) Filed: Oct. 20, 2023

(65) Prior Publication Data
US 2024/0337717 A1    Oct. 10, 2024

Related U.S. Application Data

(60) Provisional application No. 63/417,978, filed on Oct. 20, 2022.

(51) Int. Cl.
| | | |
|---|---|---|
| G01R 33/56 | (2006.01) | |
| A61B 5/055 | (2006.01) | |
| G06T 7/00 | (2017.01) | |
| G06T 7/11 | (2017.01) | |

(52) U.S. Cl.
CPC ......... *G01R 33/5608* (2013.01); *A61B 5/055* (2013.01); *G01R 33/5602* (2013.01); *G06T 7/0012* (2013.01); *G06T 7/11* (2017.01); *G06T 2207/10088* (2013.01); *G06T 2207/30008* (2013.01)

(58) Field of Classification Search
CPC ............ G01R 33/5602; G01R 33/5608; G06T 7/0012; G06T 7/11; G06T 2207/10088; G06T 2207/300008; A61B 5/055
See application file for complete search history.

(56) References Cited

U.S. PATENT DOCUMENTS

| | | | |
|---|---|---|---|
| 2014/0296696 A1* | 10/2014 | Remmele | A61B 8/0875 600/410 |
| 2016/0320466 A1* | 11/2016 | Berker | G01R 33/56509 |
| 2018/0078787 A1 | 3/2018 | Schadewaldt | |
| 2018/0085080 A1 | 3/2018 | Requardt | |
| 2021/0325496 A1* | 10/2021 | Zheng | G01R 33/5619 |
| 2021/0350544 A1 | 11/2021 | Renisch | |

FOREIGN PATENT DOCUMENTS

WO    2015103184    7/2015

OTHER PUBLICATIONS

International Search Report and Written Opinion, PCT/US2023/035621, filed Oct. 20, 2023, dated Feb. 5, 2024, 11 pages.

* cited by examiner

*Primary Examiner* — Gregory H Curran
(74) *Attorney, Agent, or Firm* — Davis Graham & Stubbs LLP

(57) ABSTRACT

Disclosed are systems, computer software, and methods for generating a relative electron density map (RED) from a magnetic resonance imaging (MRI) scan. This can include obtaining an MRI scan of a portion of a patient and segmenting a first region and a second region in the MRI scan. A RED map can then be generated from the MRI scan by assigning a first RED to the first region, assigning a second RED to the second region, and assigning REDs to unsegmented regions in the MRI scan based on intensities in the MRI scan.

20 Claims, 6 Drawing Sheets

| Composition | RED | MRI Intensity |
|---|---|---|
| Air/gas | 0.0 | Black |
| Adipose tissue | 0.9 | White |
| Water | 1.00 | Light grey |
| Cerebral spinal fluid | 1.00 | White |
| Spinal cord | 1.02 | White |
| Humors of the eye | 1.03 | Dark grey |
| Urinary bladder | 1.03 | Dark grey |
| Urine | 1.03 | Light grey |
| Muscle | 1.03 | Dark grey |
| Brain tissue | 1.05 | Dark grey |
| Bone (soft) | 1.1 | Grey |
| Bone (hard) | 1.6 | Black |

(310) Obtaining a magnetic resonance imaging (MRI) scan of a portion of a patient (320) Segmenting a first region in the MRI scan (330) Segmenting a second region in the MRI scan (340) Generating a relative electron density (RED) map from the MRI scan (350) Assigning a first RED to the first region (360) Assigning a second RED to the second region (370) Assigning REDs to unsegmented regions in the MRI scan based on intensities in the MRI scan (610) Determining a radiation therapy treatment plan utilizing the relative electron density map while the patient remains within the MRI-guided radiotherapy system (620) Controlling the MRI-guided radiotherapy system to deliver therapy to the patient while the patient remains within the MRI-guided radiotherapy system

FIG. 6

RELATIVE ELECTRON DENSITY MAPPING FROM MAGNETIC RESONANCE IMAGING

RELATED APPLICATION(S)

This application claims priority to and the benefit of U.S. Provisional Application No. 63/417,978, filed Oct. 20, 2022, titled "Relative Electron Density Mapping From Magnetic Resonance Imaging," which is hereby incorporated by reference.

DESCRIPTION OF THE RELATED ART

Magnetic resonance imaging (MRI), or nuclear magnetic resonance imaging, is a noninvasive imaging technique that uses the interaction between radio frequency pulses, a strong magnetic field (modified with weak gradient fields applied across it to localize and encode or decode phases and frequencies) and body tissue to obtain projections, spectral signals, and images of planes or volumes from within a patient's body. Magnetic resonance imaging is particularly helpful in the imaging of soft tissues and may be used for the diagnosis of disease and in conjunction with interventional procedures, such as radiation therapy or image guided surgery.

SUMMARY

Disclosed are systems, computer software, and methods for generating a relative electron density map (RED) from a magnetic resonance imaging (MRI) scan. This can include obtaining an MRI scan of a portion of a patient and segmenting a first region and a second region in the MRI scan. A RED map can then be generated from the MRI scan by assigning a first RED to the first region, assigning a second RED to the second region, and assigning REDs to unsegmented regions in the MRI scan based on intensities in the MRI scan.

In some variations, the first region is cortical bone and the second region is gas and the first region and the second region have substantially similar intensities in the MRI scan and have substantially different relative electron densities.

In some variations, the assigning of the first RED to the first region and the second RED to the second region can include assigning known average values corresponding to the compositions of the first region and of the second region, or can include assigning measured values corresponding to the compositions of the first region and the second region.

In some variations, the assigning of REDs to the unsegmented regions can include identifying ranges of intensities in the MRI scan and assigning the REDs based on the ranges of intensities.

In some variations, the assigning of the REDs can include associating compositions with the identified ranges of intensities and assigning known average values of REDs corresponding to the compositions.

In some variations, the assigning of the REDs can include utilizing REDs for compositions expected to be seen in the MRI scan.

In some variations, the operations can include determining a first sub-region within the first region where the intensities are within a first range, determining a second sub-region within the first region where the intensities are within a second range, assigning the first RED corresponding to the composition of the first sub-region, and assigning a third RED corresponding to the composition of the second sub-region.

In some variations, the first RED and the third RED can be based on a known average value for the composition, a correlation between CT/MR intensities, or measured values from a CT scan.

In some variations, the determining of the first and second sub-regions can utilize a thresholding technique.

In some variations, the MRI scan can be obtained from a patient within an MRI-guided radiotherapy system and the operations can further comprise: determining a radiation therapy treatment plan utilizing the relative electron density map while the patient remains within the MRI-guided radiotherapy system and controlling the MRI-guided radiotherapy system to deliver therapy to the patient while the patient remains within the MRI-guided radiotherapy system.

In some variations, the relative electron density map can be generated without a CT scan or can be generated from a single MRI scan.

In some variations, the MRI scan can be a balanced fast imaging MRI scan with steady-state free precession or can be a T2-weighted scan.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 6 is a process flow diagram illustrating an exemplary process for adaptive radiotherapy utilizing RED assignment in accordance with certain aspects of the present disclosure.

DETAILED DESCRIPTION

Figure 1:
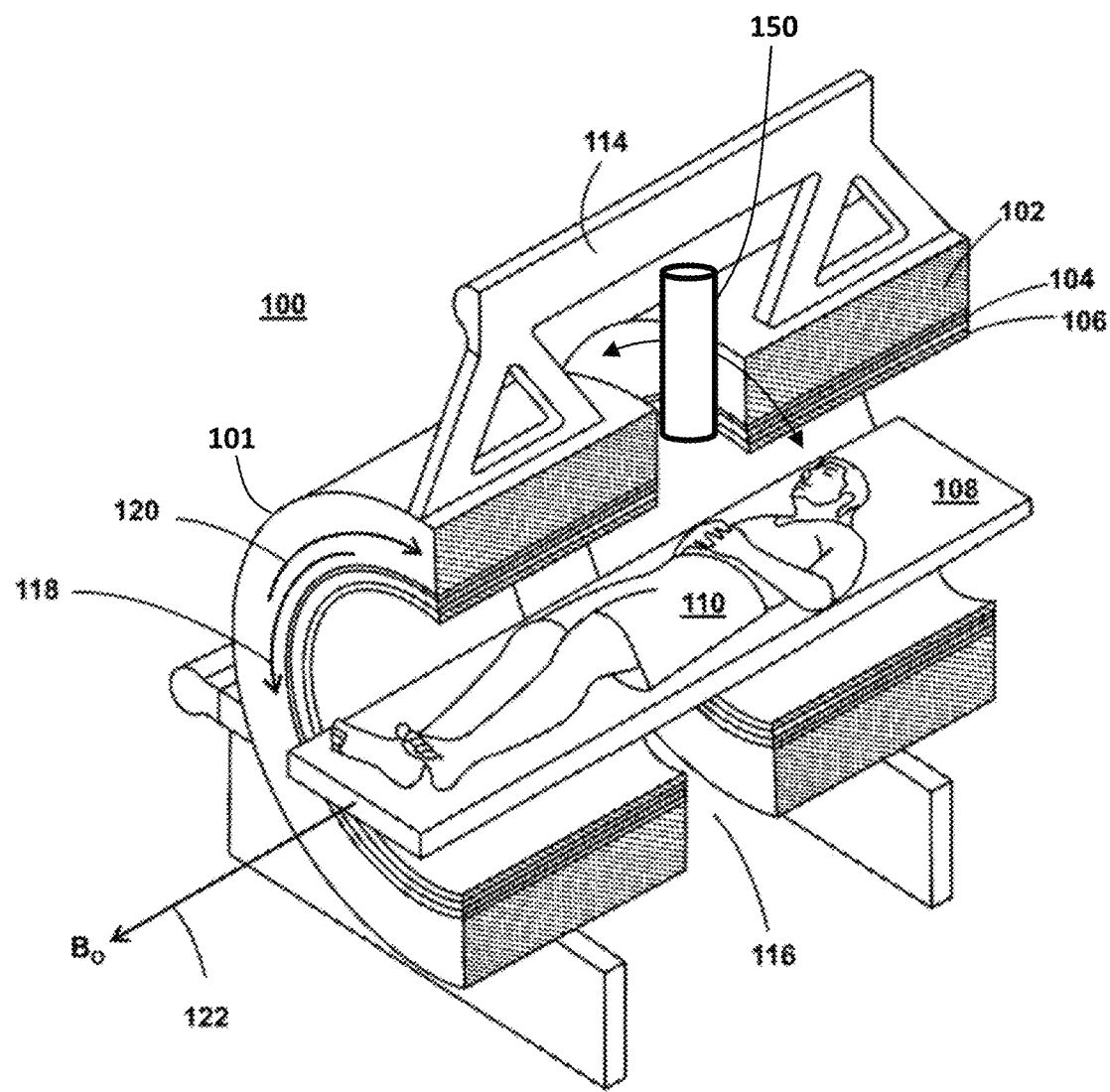
FIG. 1 illustrates an exemplary implementation of a magnetic resonance guided radiotherapy system (MRgRT system) that combines a magnetic resonance imaging system (MRI) and a radiotherapy source in accordance with certain aspects of the present disclosure.

The present disclosure provides systems, methods and software for the creation of relative electron density maps from MRI imaging. One particular application for such mapping is in the planning and delivery of MRI-guided radiotherapy. FIG. 1 illustrates one implementation of a magnetic resonance guided radiotherapy system 100 (MRgRT system) that combines a magnetic resonance imaging system 101 and a radiotherapy source 150 consistent with certain aspects of the present disclosure. In FIG. 1, MRI 101 includes a main electromagnet 102, a gradient coil assembly 104, and an RF coil system 106. Within MRI 101 is a patient couch 108 on which a patient 110 may lie. The exemplary main electromagnet 102 depicted in FIG. 1 is a gapped solenoidal electromagnet separated by buttresses 114 with a gap 116. Other MRI configurations may be used, such as a non-gapped magnet, a dipolar magnet, etc.

FIG. 1 also depicts a simplified exemplary radiotherapy device 150 for the delivery of radiation therapy. Examples of radiotherapy devices can include, for example, linear accelerators (linacs) for the delivery of high energy photons (x-rays, gamma rays, etc.), particle beam sources (e.g., proton, heavy-ion, neutron, electron, etc.), etc. Radiotherapy device 150 can be configured to move to different locations about the patient to deliver radiation at a variety of angles. For example, the radiotherapy device can be mounted on a rotatable gantry disposed between the MRI magnet halves such that the gantry can rotate about the patient to allow imaging with the MRI while delivering radiation at varying gantry angles. In other embodiments, radiotherapy device 150 can be mounted on a robotic arm or may be at a fixed position.

As used herein, the phrase "MRgRT system" refers to the hardware and/or software associated with the operation of a magnetic resonance imaging system and associated radiotherapy device. In contrast, the more general phrase "system" used throughout the present disclosure encompasses any hardware and/or software required for effecting the disclosed concepts referring to that system. Use of the term "a/the system" encompasses processors and/or computer programs (as well as the MRgRT system, as needed) to enable the disclosed concepts. The present disclosure contemplates that its relative electron density mapping technologies can be utilized in conjunction with, or separate from, MRgRT systems.

Figures 2A, 2B:
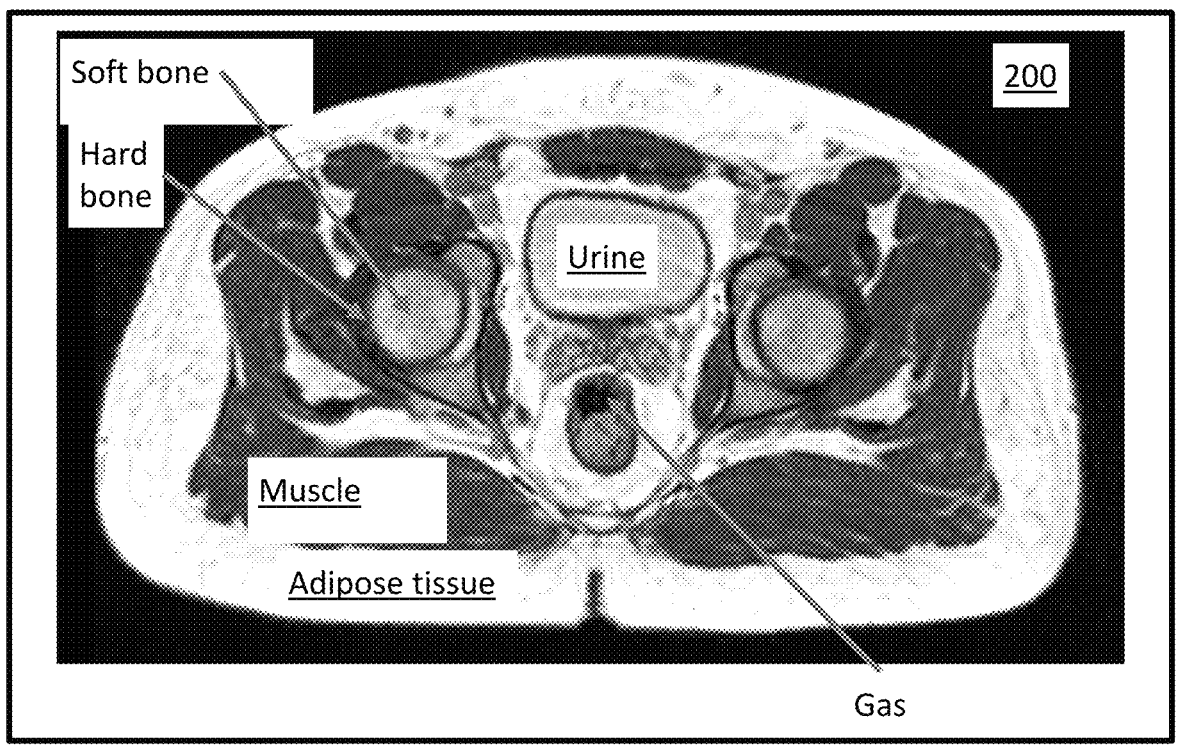
FIG. 2A is a diagram illustrating an MRI image with various anatomical regions indicated in accordance with certain aspects of the present disclosure.
FIG. 2B is a table including exemplary compositions, relative electron densities and how they may appear in an MRI in accordance with certain aspects of the present disclosure.

FIG. 2A is a diagram illustrating an exemplary MRI image with various anatomical regions labeled. Magnetic resonance imaging utilizes the magnetization of atoms in a patient to produce detailed anatomical images. A magnetic field is used to align the protons of hydrogen nuclei in the region of interest. Then, a radio frequency (RF) energy pulse is used to excite the protons into a different spin position. When the protons relax to their initial orientation, they emit RF energy that is detected and measured. The measured RF energy can be analyzed and used to generate images of anatomical regions, with one example MRI image 200 shown in FIG. 2A (showing the pelvic area of a patient). Certain anatomical regions in the exemplary image 200 are labelled, such as femoral hard bone (black), softer bone (light grey), urine (light grey), muscle (dark grey), adipose tissue (white) and gas (black).

The appearance of compositions shown in an MRI image can depend on the actual composition itself and also the imaging technique used. Depending on the composition of what is being imaged, different tissues, air, fluids, etc., can have different relaxation times—T1 and T2. T1 (longitudinal relaxation time) is the time constant that determines the rate at which excited protons return to their initial positions as aligned by the magnetic field. T2 (transverse relaxation time) is the time constant that determines the rate at which excited protons reach equilibrium or go out of phase with each other. Based on the sequencing of RF pulses, different types of images can be generated. For various imaging techniques, key parameters can include repetition time (TR), which is the amount of time between successive pulse sequences applied to the same slice. Another parameter is time to echo (TE), which is the time between the delivery of the RF pulse and the receipt of the echo signal.

Given the above, MRI sequences can be T1-weighted or T2-weighted. T1-weighted images are produced by using short TE and TR times. The contrast and brightness of the image are predominately determined by the T1 properties. T2-weighted images are produced by using longer TE and TR times, where the contrast and brightness are predominately determined by the T2 properties.

FIG. 2B is a table including exemplary anatomical regions of a patient, how they may appear in an MRI, and a list of approximate relative electron densities (which are important to the exemplary application of radiation therapy). During radiation therapy, high energy photons are scattered by electrons within the patient and deposit energy along their path. The degree of photon scattering is dependent on the compositions of the patient encountered by the photons (e.g., water, bone, adipose tissue, etc.), which can have differing densities of electrons. Because the scattered photons deliver radiation dose, radiation treatment planning must accurately account for this scattering. Dose deposition can thus be determined in part based on the relative electron density (RED) of the compositions encountered. As discussed herein, REDs can be mapped or assigned to regions within the patient in order to form RED maps that may be used by in radiation therapy planning and/or treatment software.

When the present disclosure refers to a RED map, the term is intended to encompass additional maps of patient density metrics, e.g., maps of density (g/cm3), Hounsfield numbers, etc., that provide close approximations to the REDs commonly used in radiotherapy dose calculations (for example, the RED of urine is 1.03 with the actual mass density that could also be used in planning calculations typically being 1.005 to 1.03 g/cm$^3$). Furthermore, when the present disclosure uses the term map, such refers to any data structure that details REDs across one or more regions of a patient.

As seen in FIG. 2B, regions with different compositions (e.g., air vs. hard bone) can have very different REDs (e.g., 0.0 vs. 1.6)—while at the same time appearing with similar intensities in an MRI image (i.e., both being black). A RED map therefore cannot be created based merely on correlations with MRI image intensities.

Figure 3:
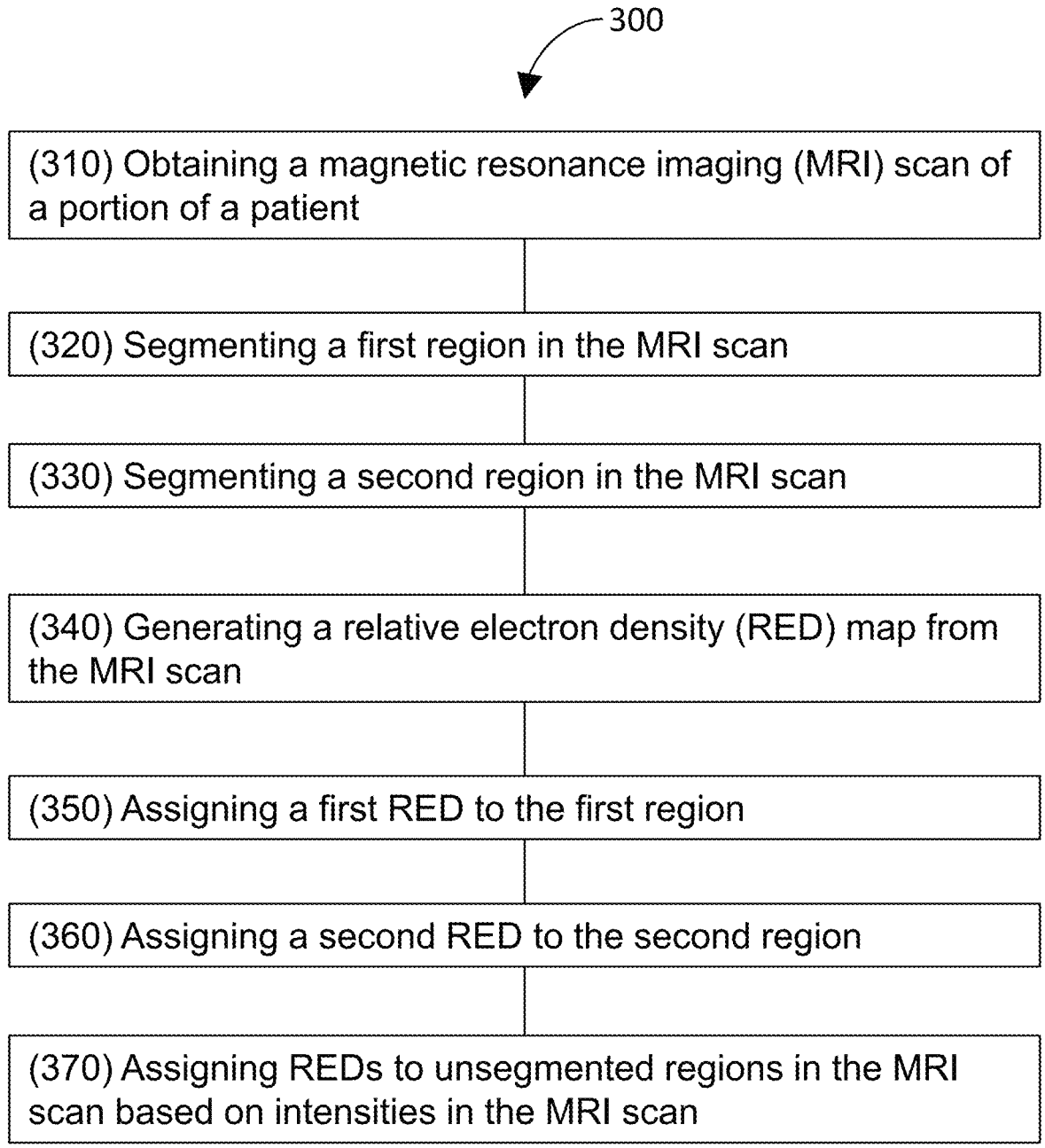
FIG. 3 is a flow diagram illustrating an exemplary process for the generation of a relative electron density map in accordance with certain aspects of the present disclosure.

FIG. 3 is a flow diagram illustrating an exemplary process for the generation of a relative electron density map in accordance with certain aspects of the present disclosure. The exemplary process can utilize the segmentation (or contouring) of regions of the patient, the assignment of REDs to segmented regions based on identification of the compositions of those segmented regions and, for unsegmented regions, the assignment of REDs based on MRI intensities.

As shown in the process 300 of FIG. 3, at 310, some embodiments can include obtaining a magnetic resonance imaging (MRI) scan of a portion of a patient, for example, as depicted in FIG. 2A. At 320, a first region in the MRI scan can be segmented. This first region can be a portion of the patient composed of cortical bone, spinal cord tissue, the urinary bladder, muscle, brain tissue, etc. At 330, a second region in the MRI scan can be segmented. The second region can be an additional region, for example, adipose tissue, the humors of the eye, cerebral spinal fluid, gas bubbles, etc. (although certain embodiments herein are described as segmenting multiple regions, the present disclosure contemplates that only a single region (e.g., just a first region) may be segmented).

With particular patient region(s) segmented, at 340 in FIG. 3, a RED map can be generated from the MRI scan. In some embodiments, generating the RED map can include, at 350, assigning a first RED to the first region and, at 360, assigning a second RED to the second region. In some embodiments, assigning the first RED and/or the second RED can be performed by software automatically determining the composition of a region and assigning a RED to that region. In other embodiments, assigning can be performed by software receiving a manual input of a RED from a user and assigning that RED to that region. With the first and/or second regions having assigned REDs, some embodiments for creating a RED map can also include, at 370, assigning REDs to unsegmented regions in the MRI scan based on intensities in the MRI scan. In the embodiments described in greater detail herein, assigning REDs to the unsegmented regions may be performed automatically by computer software based on intensities of the MRI scan in those unsegmented regions.

As used herein, "segmenting" can include manual segmenting, for example, where software receives manual contouring commands such as those provided by a user drawing contours using a computer interface. Segmenting can also include autocontouring, for example, where software automatically determines the contours, e.g., using edge detection or other such methods. Segmenting can further include software determining a region but without explicitly making a contour, for example, by identifying a region based on a known location or the intensities of pixel values in the vicinity of the region to effectively determine its boundary.

Figure 4A:
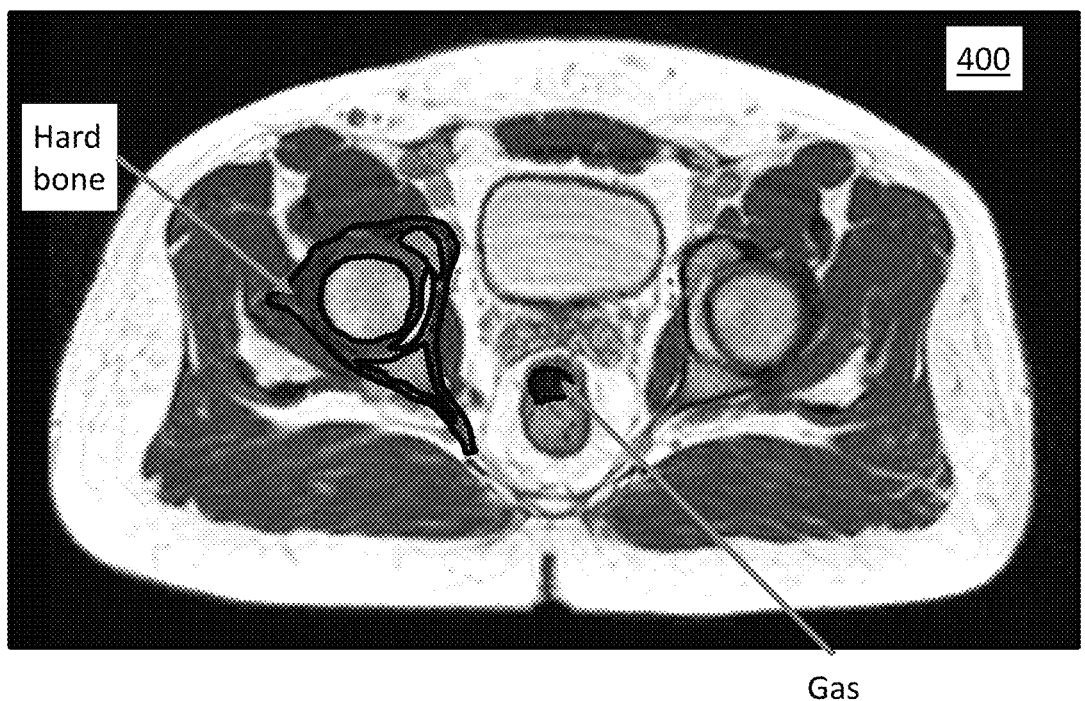
FIG. 4A is a diagram illustrating segmentation of regions in an MRI scan in accordance with certain aspects of the present disclosure.

FIG. 4A is a diagram illustrating segmentation of regions in an MRI scan in accordance with certain aspects of the present disclosure. In the exemplary MRI scan 400 of FIG. 4A, a first region can be (hard) cortical bone and the second region can be gas. While the first region and the second region can have substantially similar intensities in the MRI scan (e.g., black), they can also have substantially different relative electron densities (e.g., 1.6 and 0.0, respectively). Such regions may be referred to herein as "confounding structures" because their similar intensities in the MRI scan can confound the assignment of REDs if the assignment was to be based on MRI scan intensities alone. While the example of FIG. 4A depicts segmenting cortical bone and gas, other MRI scans can include other "confounding structures." In another example, where the region being imaged is a patient's head, the first region can be the humors of the eye and the second region can be fat-again with the first region and the second region having substantially similar intensities in the MRI scan (e.g., white) and substantially different relative electron densities (e.g., 1.03 and 0.9, respectively). Accordingly, in various embodiments, the first region and the second region can correspond to, for example, the humors of the eye, urine, cerebral spinal fluid, adipose tissue, hard cortical bone, gas bubbles, etc. The present disclosure also contemplates embodiments segmenting more than a first and second region. For example, the other femur in FIG. 4A may be contoured as a third region as well as any other gas bubbles or other confounding structures present.

Figure 4B:
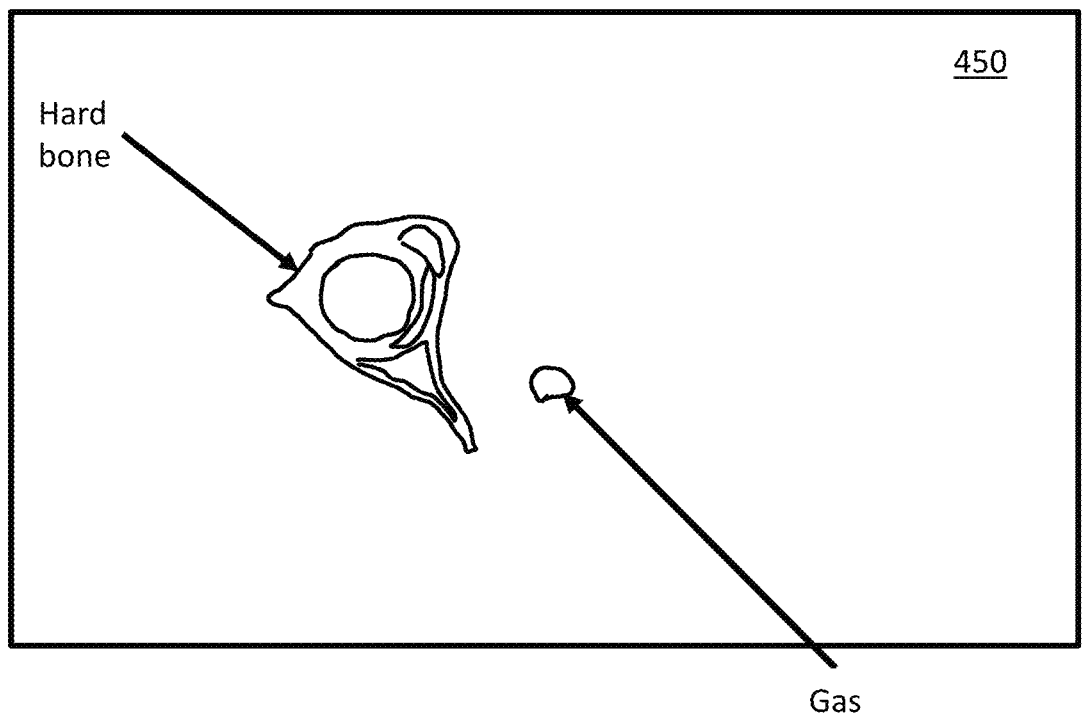
FIG. 4B is a diagram illustrating an exemplary partial RED map in accordance with certain aspects of the present disclosure.

FIG. 4B is a diagram illustrating an exemplary partial RED map in accordance with certain aspects of the present disclosure. Segmented regions can be added to RED map 450 and assigned appropriate RED values. The present disclosure contemplates multiple ways to assign REDs to regions, for example, the assigning of the first RED to the first region and the second RED to the second region can include assigning known average values corresponding to the compositions of the first region and of the second region. Such known average values can be obtained from databases, lookup tables, etc., and can be provided through manual input or software determination. In the example of FIG. 4B, a RED of 1.6 may be assigned to the hard bone and a RED of 0.0 can be assigned to the gas region. In other embodiments, the assigning of the first RED to the first region and second RED to the second region can include assigning measured values corresponding to the compositions of the first region and the second region. Such measured values can be obtained, for example, from a CT of the patient and assigned manually or automatically through software determination.

After assigning REDs to various segmented regions as described above (e.g., with regard to confounding structures), REDs can further be determined and assigned to unsegmented regions. This can include identifying ranges of intensities in the MRI scan and assigning REDs based on the ranges of intensities. For example, MRI scan 400 could have intensities ranging from 0 (black) to 255 (white) and intensities in the range of 20-40 (dark grey) could be identified as muscle and assigned a RED of 1.03. In this manner, a composition type can be associated with an intensity range and then RED values obtained and assigned (e.g., with a lookup table or other such data store) to regions corresponding to that intensity range.

In some embodiments, the assigning of REDs can also include utilizing REDs for compositions that are expected to be seen in the particular MRI scan location (within the patient). If the region being scanned is, for example, the pelvic region, that information can be used to assign REDs appropriate for the compositions expected to be seen in the pelvic region. On the contrary, if the MRI scan location is the brain, a region of brain tissue that is dark gray would be assigned a RED of 1.05 (instead of a RED of 1.03 for muscle that would be assigned to the same dark gray intensity seen in a scan of the pelvic region).

As such, various embodiments can include the system accessing specific tables for RED values for certain MRI scan locations, with the RED values being based on the compositions expected to be seen in such MRI scan locations.

Figure 5A:
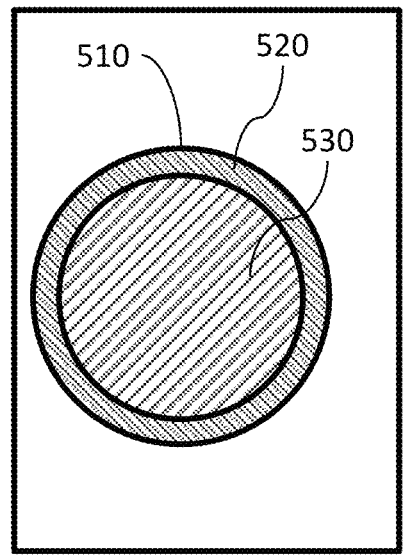
FIG. 5A is a diagram illustrating an exemplary process for the assignment of REDs in accordance with certain aspects of the present disclosure.
Figure 5B:
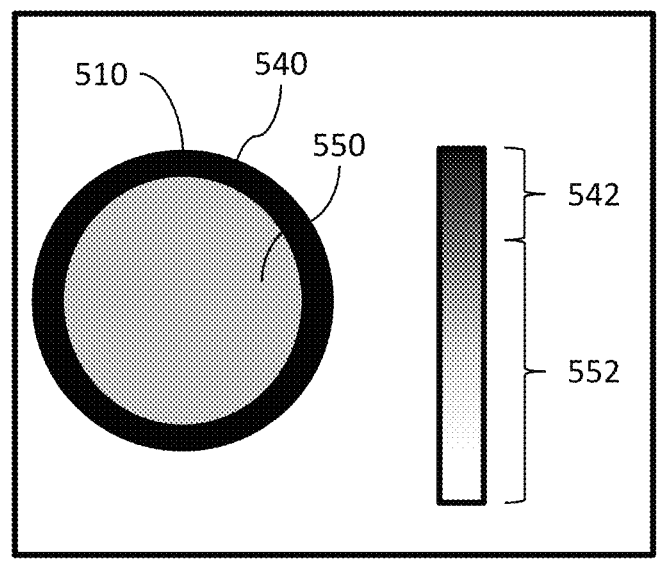
FIG. 5B is a diagram illustrating an exemplary process for assignment of REDS based at least partially on intensities in the MRI scan being within certain ranges, in accordance with certain aspects of the present disclosure.

FIGS. 5A and 5B are diagrams illustrating exemplary processes for assignment of REDs to a boney structure.

FIG. 5A is a diagram illustrating an exemplary process for assignment of REDS utilizing segmentation, in accordance with certain aspects of the present disclosure. A simplified cross-section of a bone 510 is shown. Some embodiments can include segmenting a first region of bone 510 by segmenting the cortical bone 520. The first RED can then be assigned to this first region based on known average values corresponding to the composition of cortical bone. A second RED may be assigned to a second region such as a gas bubble. And, in some embodiments, a third RED can be assigned to the region inside of the segmented cortical bone (i.e., region 530) based on known average values for the composition of soft bone. For this example, the first region of cortical bone can be assigned a RED of 1.6, the second region of gas can be assigned a RED of 0.0, and the region inside the cortical bone can be assigned RED of 1.1 for soft bone. Then, the system can continue and assign REDs to unsegmented regions based on their intensities in the MRI scan.

FIG. 5B is a diagram illustrating an exemplary process for assignment of REDS based on intensities in the MRI scan being within certain ranges, in accordance with certain aspects of the present disclosure. In this example, segmenting the first region includes segmenting the outer boundary of bone 510. The system can then determine a first sub-region 540 within the outer boundary of bone 510 where the intensities are within a first range 542 and then a second sub-region 550 within bone 510 can be determined where the intensities are within a second range 552. A first RED corresponding to cortical bone (e.g., 1.6) can be assigned to the first sub-region. A second RED may be assigned to a second region such as a gas bubble. And, a third RED corresponding to soft bone (e.g., 1.1) can be assigned to the second sub-region. As previously described, the REDs can be based on a known average value for the compositions, correlations between CT/MR intensities, measured values from a CT scan, etc. In some embodiments, the determining of the first and second sub-regions can utilize a thresholding technique.

As an example generic to the compositions of a patient (as opposed to the examples above relating to bones), embodiments of the present disclosure can include the system determining a first sub-region within a first region where the intensities are within a first range. A second sub-region can be determined within the first region where the intensities are within a second range. A first RED can be assigned to the first sub-region, a second RED can be assigned to a second region, and a third RED can be assigned to the second sub-region. Similar to the above examples for boney structures, determining of the first and second sub-regions can utilize a thresholding technique. Also, the REDs can be based on known average values for the compositions, correlations between CT/MR intensities, measured values from a CT scan, etc.

FIG. 6 is a process flow diagram illustrating an exemplary process for adaptive radiotherapy utilizing RED map creation in accordance with certain aspects of the present disclosure. Any of the embodiments herein can be utilized in conjunction with the performance of adaptive radiotherapy by generating a RED map while the patient is in a MRgRT system for treatment (e.g., without requiring a separate CT scan). Such embodiments can include those where the MRI scan is obtained from a patient within the MRI-guided radiotherapy system and the operations (e.g., as described with reference to FIG. 3 and reproduced in FIG. 6) further include, at 610, determining a radiation therapy treatment plan utilizing the relative electron density map while the patient remains within the MRI-guided radiotherapy system. Additionally, at 620, the system can control the MRI-guided radiotherapy system to deliver therapy to the patient while the patient remains within the MRI-guided radiotherapy system. As such, in some embodiments, the RED map can be generated without a CT scan and may be generated from a single MRI scan.

Many different types of MRI pulse sequences can be implemented, but in one embodiment, the MRI scan can be a T2-weighted scan. In other embodiments, the MRI scan can be a balanced fast imaging MRI scan with steady-state free precession where the pulse sequence can be balanced such that the gradients can return the nuclei to the same phase they had before the gradients were applied. These embodiments can be utilized, for example, to clearly show fluids such as cerebral spinal fluid.

In the following, further features, characteristics, and exemplary technical solutions of the present disclosure will be described in terms of items that may be optionally claimed in any combination:

Item 1: A system comprising: at least one programmable processor; and a non-transitory machine-readable medium storing instructions which, when executed by the at least one programmable processor, cause the at least one programmable processor to perform operations comprising: obtaining a magnetic resonance imaging (MRI) scan of a portion of a patient; segmenting a first region in the MRI scan; segmenting a second region in the MRI scan; and generating a relative electron density (RED) map from the MRI scan, the generating comprising: assigning a first RED to the first region; assigning a second RED to the second region; and assigning REDs to unsegmented regions in the MRI scan based on intensities in the MRI scan.

Item 2: The system as in Item 1, wherein the first region is cortical bone and the second region is gas and the first region and the second region have substantially similar intensities in the MRI scan and substantially different relative electron densities.

Item 3: The system as in any one of the preceding Items, wherein the first region is the humors of the eye and the second region is adipose tissue and the first region and the second region have substantially similar intensities in the MRI scan and substantially different relative electron densities.

Item 4: The system as in any one of the preceding Items, wherein the first region and the second region correspond to the humors of the eye, urine, cerebral spinal fluid, adipose tissue, hard cortical bone, or gas bubbles.

Item 5: The system as in any one of the preceding Items, the assigning of the first RED to the first region and the second RED to the second region further comprising assigning known average values corresponding to the compositions of the first region and of the second region.

Item 6: The system as in any one of the preceding Items, the assigning of the first RED to the first region and second RED to the second region further comprising assigning measured values corresponding to the compositions of the first region and the second region.

Item 7: The system as in any one of the preceding Items, wherein the assigning of REDs to the unsegmented regions further comprises: identifying ranges of intensities in the MRI scan; and assigning the REDs based on the ranges of intensities.

Item 8: The system as in any one of the preceding Items, wherein the assigning of the REDs further comprises: associating compositions with the identified ranges of intensities; and assigning known average values of REDs corresponding to the compositions.

Item 9: The system as in any one of the preceding Items, wherein the assigning of the REDs further comprises: utilizing REDs for compositions expected to be seen in the MRI scan.

Item 10: The system as in any one of the preceding Items, wherein segmenting the first region comprises segmenting cortical bone, and the assigning of the first RED to the first region comprises assigning the first RED based on known average values corresponding to the composition of cortical bone; and the operations further comprising assigning a third RED to the region inside the segmented cortical bone based on known average values for the composition of soft bone.

Item 11: The system as in any one of the preceding Items, wherein segmenting the first region comprises segmenting an outer boundary of a bone; the operations further comprising: determining a first sub-region within the outer boundary of the bone where the intensities are within a first range; determining a second sub-region within the outer boundary of the bone where the intensities are within a second range; assigning the first RED corresponding to cortical bone to the first sub-region; and assigning a third RED corresponding to soft bone to the second sub-region.

Item 12: The system as in any one of the preceding Items, wherein the first RED and the third RED are based on a known average value for the composition, a correlation between CT/MR intensities, or measured values from a CT scan.

Item 13: The system as in any one of the preceding Items, wherein the determining of the first and second sub-regions utilizes a thresholding technique.

Item 14: The system as in any one of the preceding Items, the operations further comprising: determining a first sub-region within the first region where the intensities are within a first range; determining a second sub-region within the first region where the intensities are within a second range; assigning the first RED corresponding to the composition of the first sub-region; and assigning a third RED corresponding to the composition of the second sub-region.

Item 15: The system as in any one of the preceding Items, wherein the first RED and the third RED are based on a known average value for the composition, a correlation between CT/MR intensities, or measured values from a CT scan.

Item 16: The system as in any one of the preceding Items, wherein the determining of the first and second sub-regions utilizes a thresholding technique.

Item 17: The system as in any one of the preceding Items, wherein the MRI scan is obtained from a patient within an MRI-guided radiotherapy system and the operations further comprising: determining a radiation therapy treatment plan utilizing the relative electron density map while the patient remains within the MRI-guided radiotherapy system; and controlling the MRI-guided radiotherapy system to deliver therapy to the patient while the patient remains within the MRI-guided radiotherapy system.

Item 18: The system as in any one of the preceding Items, wherein the relative electron density map is generated without a CT scan.

Item 19: The system as in any one of the preceding Items, wherein the relative electron density map is generated from a single MRI scan.

Item 20: The system as in any one of the preceding Items, wherein the MRI scan is a balanced fast imaging MRI scan with steady-state free precession.

Item 21: The system as in any one of the preceding Items, wherein the MRI scan is a T2-weighted scan.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system comprising:
   at least one programmable processor; and
   a non-transitory machine-readable medium storing instructions which, when executed by the at least one programmable processor, cause the at least one programmable processor to perform operations comprising:
      obtaining a magnetic resonance imaging (MRI) scan of a portion of a patient, wherein the MRI scan is obtained from a patient within an MRI-guided radiotherapy system;
      segmenting a first region in the MRI scan;
      segmenting a second region in the MRI scan;
      generating a relative electron density (RED) map from the MRI scan, the generating comprising:
         assigning a first RED to the first region;
         assigning a second RED to the second region; and
         assigning REDs to unsegmented regions in the MRI scan based on intensities in the MRI scan;
      determining a radiation therapy treatment plan utilizing the relative electron density map while the patient remains within the MRI-guided radiotherapy system; and
      controlling the MRI-guided radiotherapy system to deliver therapy to the patient while the patient remains within the MRI-guided radiotherapy system.

2. The system of claim 1, wherein the first region is cortical bone and the second region is gas and the first region and the second region have substantially similar intensities in the MRI scan and substantially different relative electron densities.

3. The system of claim 1, wherein the first region is the humors of the eye and the second region is adipose tissue and the first region and the second region have substantially similar intensities in the MRI scan and substantially different relative electron densities.

4. The system of claim 1, wherein the first region and the second region correspond to the humors of the eye, urine, cerebral spinal fluid, adipose tissue, hard cortical bone, or gas bubbles.

5. The system of claim 1, the assigning of the first RED to the first region and the second RED to the second region further comprising assigning known average values corresponding to the compositions of the first region and of the second region.

6. The system of claim 1, the assigning of the first RED to the first region and second RED to the second region further comprising assigning measured values corresponding to the compositions of the first region and the second region.

7. The system of claim 1, wherein the assigning of REDs to the unsegmented regions further comprises:
   identifying ranges of intensities in the MRI scan; and
   assigning the REDs based on the ranges of intensities.

8. The system of claim 7, wherein the assigning of the REDs further comprises:
  associating compositions with the identified ranges of intensities; and
  assigning known average values of REDs corresponding to the compositions.

9. The system of claim 7, wherein the assigning of the REDs further comprises:
  utilizing REDs for compositions expected to be seen in the MRI scan.

10. The system of claim 1, wherein segmenting the first region comprises segmenting cortical bone, and the assigning of the first RED to the first region comprises assigning the first RED based on known average values corresponding to the composition of cortical bone; and
  the operations further comprising assigning a third RED to the region inside the segmented cortical bone based on known average values for the composition of soft bone.

11. The system of claim 1, wherein segmenting the first region comprises segmenting an outer boundary of a bone; the operations further comprising:
  determining a first sub-region within the outer boundary of the bone where the intensities are within a first range;
  determining a second sub-region within the outer boundary of the bone where the intensities are within a second range;
  assigning the first RED corresponding to cortical bone to the first sub-region; and
  assigning a third RED corresponding to soft bone to the second sub-region.

12. The system of claim 11, wherein the first RED and the third RED are based on a known average value for the composition, a correlation between CT/MR intensities, or measured values from a CT scan.

13. The system of claim 11, wherein the determining of the first and second sub-regions utilizes a thresholding technique.

14. The system of claim 1, the operations further comprising:
  determining a first sub-region within the first region where the intensities are within a first range;
  determining a second sub-region within the first region where the intensities are within a second range;
  assigning the first RED corresponding to the composition of the first sub-region; and
  assigning a third RED corresponding to the composition of the second sub-region.

15. The system of claim 14, wherein the first RED and the third RED are based on a known average value for the composition, a correlation between CT/MR intensities, or measured values from a CT scan.

16. The system of claim 14, wherein the determining of the first and second sub-regions utilizes a thresholding technique.

17. The system of claim 1, wherein the relative electron density map is generated without a CT scan.

18. The system of claim 1, wherein the relative electron density map is generated from a single MRI scan.

19. The system of claim 1, wherein the MRI scan is a balanced fast imaging MRI scan with steady-state free precession.

20. The system of claim 1, wherein the MRI scan is a T2-weighted scan.

* * * * *